United States Patent
Yates

(10) Patent No.: US 6,708,650 B1
(45) Date of Patent: Mar. 23, 2004

(54) METHOD FOR INSTALLING AN EXERCISING HARNESS ON AN ANIMAL

(76) Inventor: Rachel Yates, 1311 Westwick Forest La., Houston, TX (US) 77043

(*) Notice: Subject to any disclaimer, the term of this patent is extended or adjusted under 35 U.S.C. 154(b) by 0 days.

(21) Appl. No.: 10/400,206

(22) Filed: Mar. 27, 2003

(51) Int. Cl.[7] ............................................... A01K 15/02
(52) U.S. Cl. ..................... 119/792; 119/712; 119/818
(58) Field of Search ................. 119/792, 793, 119/712, 818, 816, 856, 905; 54/71

(56) References Cited

U.S. PATENT DOCUMENTS

| | | | |
|---|---|---|---|
| 216,705 A | * | 7/1879 | Smith .......................... 54/71 |
| 3,994,264 A | | 11/1976 | Flynt |
| RE32,547 E | | 11/1987 | Reed et al. |
| 4,896,630 A | | 1/1990 | Lace |
| 4,964,369 A | | 10/1990 | Sporn |
| 5,329,885 A | | 7/1994 | Sporn |
| 5,359,964 A | | 11/1994 | Sporn |
| 5,370,083 A | | 12/1994 | Sporn |
| 5,383,426 A | | 1/1995 | Krauss |
| 5,471,953 A | | 12/1995 | Sporn |
| 5,485,810 A | | 1/1996 | Sporn |
| 5,611,298 A | | 3/1997 | Sporn |
| 5,660,146 A | | 8/1997 | Sporn |
| 5,676,093 A | | 10/1997 | Sporn |
| 5,713,308 A | | 2/1998 | Holt, Jr. |
| 5,934,224 A | | 8/1999 | Sporn |
| 5,937,794 A | | 8/1999 | Hediger |
| 6,354,247 B1 | | 3/2002 | Andrews |
| 6,401,666 B1 | | 6/2002 | Kircher |

* cited by examiner

*Primary Examiner*—Yvonne Abbott
(74) *Attorney, Agent, or Firm*—Andy Arismendi, Jr.

(57) ABSTRACT

A method for installing a harness on a four-legged animal, wherein the harness includes a first loop, a second loop, and a first connecting portion. The first and second loops are connected to the first connecting portion. The method includes at least placing the first and second loops substantially around the left and right rear legs, respectively, placing the first connecting portion adjacent the rear back of the animal such that the first and second loops are below the left and right hind leg pits, respectively, and attaching the first connecting portion directly or indirectly to a leash. By pulling the first connecting portion in a forward direction, this causes the first and second loops to come into contact with the left and right rear leg pits and impose pressure thereon urging the animal to take action to release the pressure by sitting up and or moving forward.

9 Claims, 8 Drawing Sheets

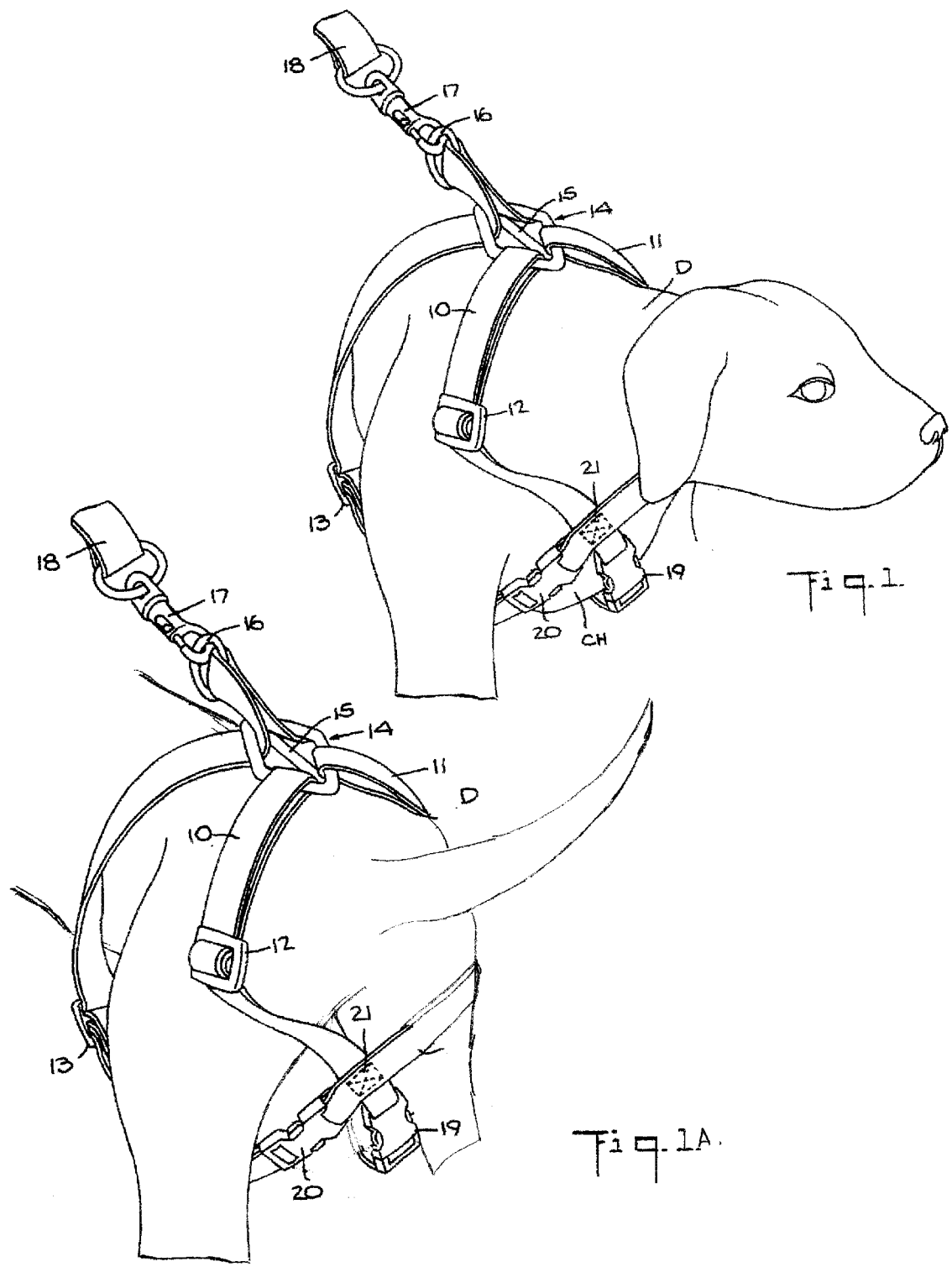

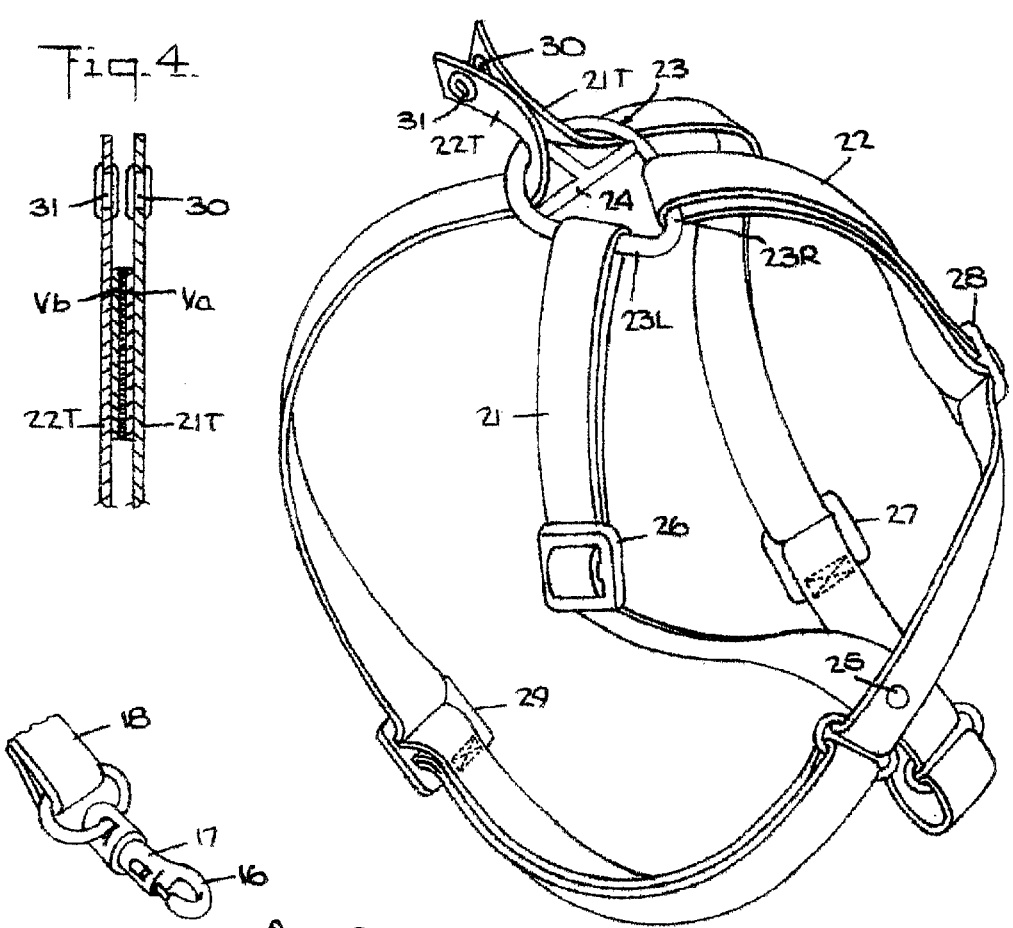
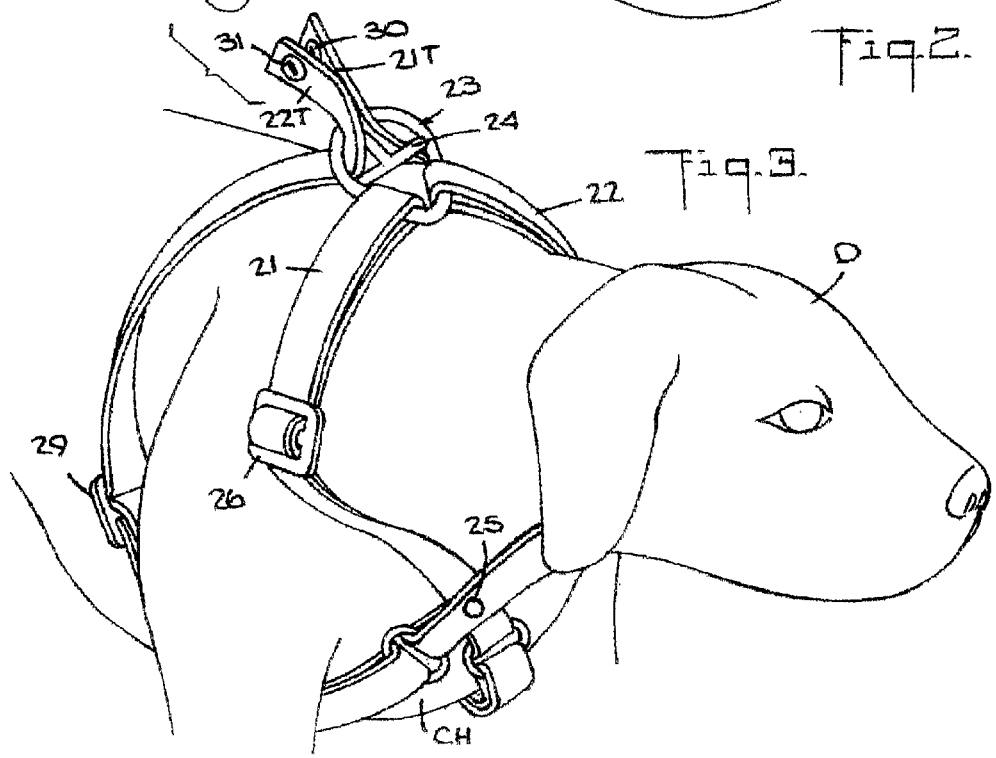

METHOD FOR INSTALLING AN EXERCISING HARNESS ON AN ANIMAL

BACKGROUND OF THE INVENTION

This invention relates generally to a four-legged animal harness which is connected to a leash held by an individual walking the animal, and more particularly, to a method of installing such a harness on the rear of the animal and attaching a leash thereto adapted to inhibit the animal, for example, a dog or goat, from straining against the leash while attempting to sit or slow down the walking pace and inducing the dog to come to a standing position or to walk at a pace acceptable to the leash holder, respectively.

Throughout the world, dogs are kept as pets; and on farms and ranches, dogs are frequently trained for performing a variety of useful work tasks. In addition, sportsmen, particularly bird hunters, long have trained dogs to assist them in hunting by locating and retrieving game. In addition, it is becoming increasingly popular to breed dogs, sheep, goats and pigs for competition in animal shows, where the conformation and other characteristics of the animals are judged according to pre-established standards.

Most dogs are very active animals. However, if dogs become to accustom to inactivity or with age become very lethargic or lazy and tired, they may resist exercise. These conditions are abnormal and undesirable. Other animals such as goats, sheep and pigs may become stubborn and sit to resist training and walking exercise.

For show animals, the lack of exercise generally is manifested in poor physical conformation with the resultant poor placements in animal shows in which such animals are entered. Consequently, it is desirable to find some way to avoid the results of insufficient exercise.

It is desirable to provide an exercising harness for animals, such as dogs, goats, sheep, pigs and the like, which may be comfortably worn by the animal and which is capable of exercising the animal to build muscle tone in confined spaces or in relatively short periods of time and inhibit the tendency of these animals to sit. Such a device also must be such that it is easy to install, simple in construction, nor harmful to the animal in any way, and it must permit normal let and body movement of the animal being exercised.

SUMMARY OF THE INVENTION

Accordingly, there is provided a method of installing a harness on a four-legged animal used to aid in training and exercising the animal and to aid in urging the animal from a sitting position to an upright position. The animal has a rear back, a rear end, a left rear leg, a left rear leg pit, a right rear leg and a right rear leg pit. The harness comprises a first loop, a second loop, and a first connecting portion, wherein said first and second loops are connected to the first connecting portion. With such a harness, the method comprises:

placing the first loop substantially around the left rear leg;

placing the second loop substantially around the right rear leg;

placing the first connecting portion adjacent the rear back such that the first and second loops are below the left and right rear leg pits, respectively; and attaching the first connecting portion directly or indirectly to a leash, whereby pulling the first connecting portion in a forward direction relative to the animal causes the first and second loops to come into contact with the left and right rear leg pits and impose pressure thereon urging the animal to take action to release the pressure by sitting up and or moving forward.

In one embodiment, the leash is directly connected to the first connecting portion.

In another embodiment, the method further comprises:

attaching a collar or a chest harness having a slide loop to the neck;

feeding a lead line having a first end and a second end through the slide loop;

attaching the first end to the first connecting portion; and attaching the second end to the leash.

In one embodiment, the first loop and the second loop each have a first loop end and a second loop end. With a harness of this type, the method further includes crossing the first loop and the second loop adjacent the rear end of the animal prior to connecting to the first connecting portion creating a crossing site. Thus, when the first connecting portion is pulled forward, the crossing site places pressure on the rear end of the animal also urging the animal up from a sitting position to a standing position and or forward in a standing position to commence or continue walking at a desired pace.

In another embodiment, the harness has a second connecting portion that is attached to the first and second loops. With a harness of this type, the second connecting portion is adjacent to the rear end of the animal in an installed position on the animal. Thus, when the first connecting portion is pulled forward, the second connecting portion places pressure on the rear end of the animal also urging the animal up from a sitting position to a standing position and or forward in a standing position to commence or continue walking at a desired pace.

In another aspect of the invention, there is provided a harness for a four-legged animal, the harness comprising:

a first adjuster;

a second adjuster;

a strap having a first end loop and a second end loop;

a first leg loop; and a second leg loop, wherein the strap extending from the first end loop is inserted through the first leg adjuster and then back through the first leg adjuster forming the first leg loop, then through the second adjuster and back through the second adjuster forming the second leg loop, and then through the first end loop forming a triangular shaped opening with the first adjuster, second adjuster and first end loop as the apexes for the triangular opening, wherein the triangular opening is for the head or the tail of the animal depending if installed on the chest of the animal or on the rear end of the animal, respectively.

The harness preferably has a first leg protector on the first leg loop, and a second leg protector on the second leg loop.

The harness can also include means for attaching a leash to the strap. In one embodiment, the means for attaching a leash is a second end loop on the strap. In another embodiment, a lead line is attached to the second end loop and the leash is attached to the other end of lead line. A collar or chest harness can be added with the lead line extending through a slip loop on the collar or chest harness.

BRIEF DESCRIPTION OF THE DRAWING

For a better understanding of the invention as well as other objects and further features thereof, reference is made to the following detailed description to be read in conjunction with the accompanying drawings, wherein:

FIG. 1 shows a dog wearing a harness according to U.S. Pat No. 5,329,885 installed according to the method disclosed therein;

FIG. 1A shows a dog wearing the harness of U.S. Pat No. 5,329,885 installed according to the method of the present invention;

FIG. 2 illustrates, in perspective, a dog harness according to U.S. Pat No. 5,359,964;

FIG. 3 shows the harness of FIG. 2 installed on a dog according to the method disclosed by U.S. Pat No. 5,359,964;

FIG. 4 illustrates how the trailing ends of the loop straps are fastened together so that they can be coupled to a leash;

DETAILED DESCRIPTION

Figure 6:
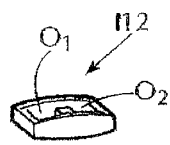
FIG. 6 is a separate view of the buckle included in the harness.

Reference now should be made to the drawings in which the same reference numbers are used in the different figures to designate the same or similar components.

Briefly, this invention relates generally to a four-legged animal harness which is connected to a leash held by an individual walking the animal, and more particularly, to a method of installing such a harness on the rear of the animal and attaching a leash thereto adapted to inhibit the animal, for example, a dog, goat, sheep, pig and the like, from straining against the leash while attempting to sit or slow down the walking pace and inducing the animal to come to or remain in a standing position or to walk at a pace acceptable to the leash holder, respectively.

For the most part, harnesses have been developed for installation on the front of the animal with loops going substantially around the forelegs. Several of these are U.S. Pat. Nos. 5,329,885; 5,359,964; 5,934,224; 5,676,093; 5,471,953; 5,660,146; 5,611,298; 5,370,083; and 5,485,810 all to Sporn, which are hereby incorporated by reference. The method of the present invention involves installing such harnesses on a four-legged animal such as a dog, goat, sheep, pig and the like, but the harness is installed with the tail of the animal being where the head is normally placed in these prior art harnesses and the loops formerly substantially going around the fore legs to exert pressure on the pits thereof now as part of the method of the present invention substantially go around the rear legs of the animal exerting pressure when necessary on the pits thereof and if present a crossing site of the two loops or a connecting portion connecting the two loops adjacent the rear end of the animal focuses some of the force exerted by the individual leading the animal on the rear end to encourage the animal to go from a sitting position to a standing position and/or to commence or remain walking at the desired pace.

Similarly, the harnesses disclosed in U.S. Pat. No. 5,713,308 to Holt, Jr., and U.S. Pat. No. 6,401,666 to Kircher, which are hereby incorporated by reference, can be installed using the method of the present invention with the tail extending out of the opening where the head was therein disclosed to extend and using the rear legs instead of the forelegs.

The harnesses of U.S. Pat. No. 4,964,369 to Sporn and U.S. Pat. No. 5,383,426 to Kraus, which are hereby incorporated by reference, may be installed according to the method of the present invention with the collar portion thereof enlarged in circumference so as to be placed around the girth of the animal, that is the trunk of the animal behind the rib cage and before the pelvis of the animal, with the loops thereof going substantially around the rear legs instead of the fore legs as disclosed in these references. The loops thereof can be crossed creating a crossing site or attached together directly or by using a connecting portion, wherein the crossing site or the connecting potion is positioned adjacent to the rear end of the animal to allow the exertion of force thereon when a leash attached to the harness is pulled.

For the purpose of example, and not by way of limitation, the following harnesses are discussed relative to their prior method of installation and installation according to the present method, where the animal discussed is a dog.

Reference is now made to FIGS. 1 through 4, where the harnesses disclosed in U.S. Pat Nos. 5,329,885 and 5,359,964 to Sporn.

Referring now to FIG. 1, the harness of U.S. Pat No. 5,329,885 includes a pair of loops 10 and 11 formed by straps which may be of fabric web or other material whose lengths are adjustable by means of tri-slides 12 and 13. The adjustment is made by sliding these slides along the loop straps. Also provided is a diamond-shaped junction 14 divided into two triangular openings by a diagonal bar 15. One end of loop 10 is coupled to the lower left arm of junction 14, and one end of loop 11 is coupled to the lower right arm of the junction 14.

The other end of loop 10 passes through the left opening in the junction 14 and slides against the upper right arm of this junction. These ends terminate in a common harness coupling ring 16.

The metal snap connector 17 of a leash 18 is coupled to coupling ring 15; hence, when one pulls the leash, the ends of loops 10 and 11 slide over the upper arms of the junction 14 to tighten the loops. Loop 10 is provided with a plastic side release buckle 19, and loop 11 with a side release buckle 20 so that the loops can be unbuckled from the dog to remove the harness.

To install the harness according to U.S. Pat No. 5,329,885, the junction 14 is placed on the dog's shoulder midway between the dog's left and right forelegs. Loop 10 is buckled so that it passes through the crotch between chest CH and the left foreleg of the dog D. And loop 11 is buckled so that it passes through the crotch between chest CH and the right foreleg, the loops being angled with respect to each other and crossing over at a site 21 where they are stitched together.

Referring now to FIG. 1A, the harness according to U.S. Pat No. 5,329,885 is shown in an installed position using the method of the present invention. In this case, the junction 14 is placed on the dog's spine on its rear back midway between the dog's left and right rear legs. Loop 10 is buckled so that it passes through the crotch between abdomen and the left rear leg of the dog D. And loop 11 is buckled so that it passes through the crotch between the abdomen and the right rear leg, the loops being angled with respect to each other and crossing over at a site 21 where they are stitched together. Site 21 is adjacent the rear end of the dog D.

The sizes of the loops are pre-adjusted so that when installed on the dog, the loops are somewhat loose and do not bind the dog at any point. But however adjusted in size, the loops cannot become disengaged from junction 14, for bar 15 on the junction prevents the ends of the loops coupled to common ring 16 from slipping out of the junction 14.

When, therefore, the harnessed dog is led by an individual holding leash 18 at an acceptable pace and the walking dog does not strain against the leash, the harness remains loose and comfortable, and the loops passing through the crotches are then disengaged from the sensitive pits of the dog's rear legs.

However, should the dog to try to sit and not continue the training or seek to decrease its pace so that it is moving slower than the individual walking the dog, the leash will then be strained. This strain will act to exert a pull on ring 16 which will draw the ends of loops 10 and 11 coupled thereto further out of junction 14 and in doing so tighten the loops passing through the crotches, thereby causing the loops to ride up the crotches to engage and press against the rear leg pits. The resultant discomfort will induce the dog to relax the strain on the leash so that the loops no longer press against the sensitive pits by getting up from a sitting position to a standing position and or commence or resume walking at the desired pace. Additionally, the force exerted on the leash in a forward direction is also transmitted to the rear end of the dog at the contact point of site 21 with the dog. This will also aid in inducing the dog to go from a sitting position to a standing position and commence walking. Animals being trained for animal shows such as goats sometimes exhibit the sitting behavior and reluctance to be walked. This harness is also quite effective with animals of that type, particularly goats.

Referring now to FIGS. 2 and 3, the harness of U.S. Pat No. 5,359,964 is composed of a pair of loops formed by straps 21 and 22 of fabric webbing or similar material, and a junction 23 having a generally triangular form. Junction 23 is provided with a T-shaped bar 24 whose horizontal component bridges opposing sides of the junction and whose vertical component is joined to the upper end of the junction. The bar defines left and right openings.

The leading end of strap 21 is linked to the lower right arm 23R of the junction and the leading end of strap 22 is coupled to the lower right arm 23R of the junction. The loops created by the straps are angled with respect to each other and are interconnected by a rivet at a crossover site 25.

The length of the strap 21 between its leading end linked to arm 23C and crossover site 25 is adjustable by means of a tri-slide 26 and its length between this site and the trailing end 21T the strap is adjustable by means of a tri-slide 27. The length of strap 22 between its leading end linked to arm 23R and crossover site 25 is adjustable by means of a tri-slide 28 and is length between this site and the trailing end 22T of the strap is adjustable by means of tri-slide 29.

The trailing end 20T of strap 21 slides through the right opening injunction 23 and terminates in a grommet 30. The trailing end 22T of strap 22 slide through the left opening in junction 23 and terminates in a grommet 31.

As best seen in FIG. 4, secured to the inner surface of trailing end 21T of strap 21, just below the grommet 30, is one component $V_a$ of a VELCRO nylon hook and loop fastener, while secured to the inner surface of trailing end 22T of strap 22 just below grommet 31 is the other component $V_b$ of the fastener.

When the two components of the VELCRO fastener are fastened together the grommets 30 and 31 lie in registration with each other and the retractable coupling ring 16 of the snaps connector 17 may then be linked to the grommets.

Hence when the harness is installed according to the method disclosed in U.S. Pat No. 5,359,964 and when the leash is pulled, the action exerts a pull on both straps to cause the loops formed by the straps to tighten and ride up the foreleg crotches of the dog to apply pressure to the highly-sensitive foreleg pits and in doing so induce the dog to relieve this pressure by relaxing the strain exertion on the leash.

Should the dog's master wish to give the dog his freedom by disconnecting the leash from the harness, this action will not cause the harness to come off the dog, for the trailing ends 21T and 22T of the straps are held together by the VELCRO fastener and therefore will not slip out of the junction 23, for the joined together trailing ends will be intercepted by the T-bar 24.

According to U.S. Pat. No. 5,359,964, to install the harness on the dog, one has only to place the junction 23 on the shoulder of the dog and pass the straps under the crotches of the forelegs, and slide the trailing ends of the straps through the openings in the junction 23. When the harness is installed, the crossover site 25 lies below the chest CH of the dog. The harness includes no buckles and there is no need therefore to buckle the straps to complete the loops. If one wishes to remove the harness from the dog, to do so, one has only to pull apart the trailing ends of the straps, so that they can slip out of the shoulder junction, the straps then being withdrawn from the foreleg crotches.

Figure 3A:
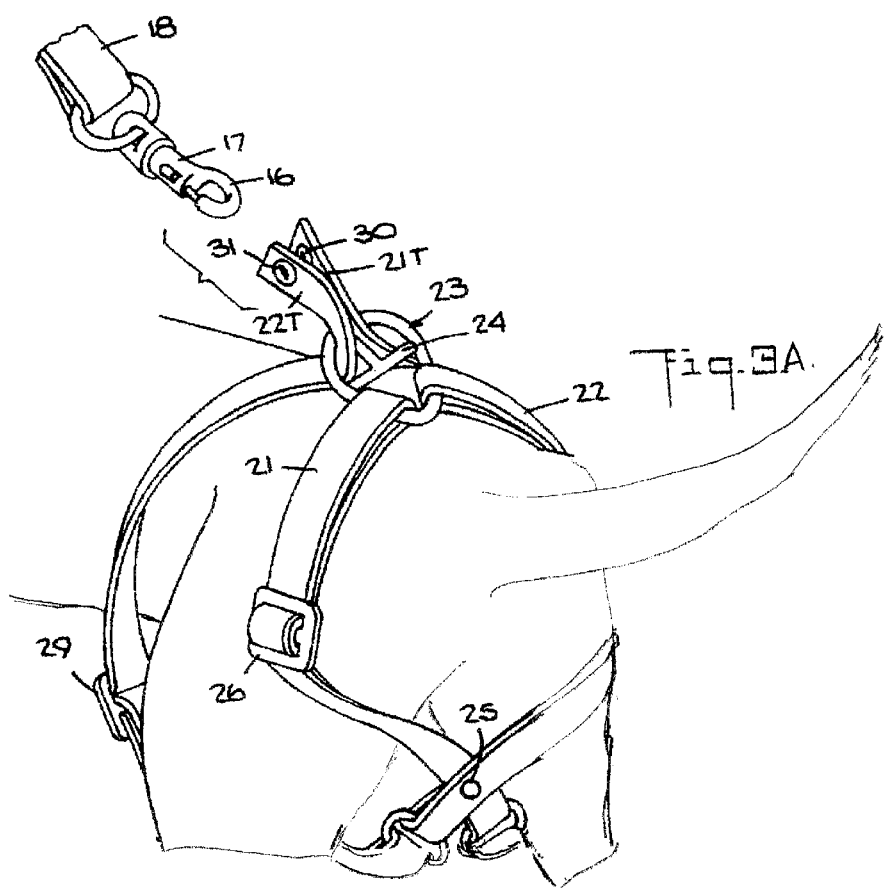
FIG. 3A shows a dog wearing the harness of U.S. Pat No. 5,359,964 installed according to the method of the present invention.

Referring now to FIG. 3A, the harness of U.S. Pat No. 5,359,964 is shown installed using the method of the present invention for installing harnesses. The harness is installed by placing junction 23 on the rear back of the dog and passing the straps under the crotches of the rear legs, and sliding the trailing ends of the straps through the openings in the junction 23. When the harness is installed, the crossover site 25 lies adjacent the rear end of the dog. The harness includes no buckles and there is no need therefore to buckle the straps to complete the loops. If one wishes to remove the harness from the dog, to do so, one has only to pull apart the trailing ends of the straps, so that they can slip out of the junction 23, the straps then being withdrawn from the rear leg crotches.

Hence when the harness of U.S. Pat No. 5,359,964 is installed according to the method of the present invention and when the leash is pulled, the action exerts a pull on both straps to cause the loops formed by the straps to tighten and ride up the rear leg crotches of the dog to apply pressure to the highly-sensitive rear leg pits and in doing so induce the dog to relieve this pressure by relaxing the strain exertion on the leash by getting up from a sitting position to a standing position and commence walking or by increasing the pace of the walk to the desired pace. Additionally, the crossover site 25 places pressure on the rear end of the dog further urging the dog to stand up and commence or maintain the desired pace.

Figure 5:
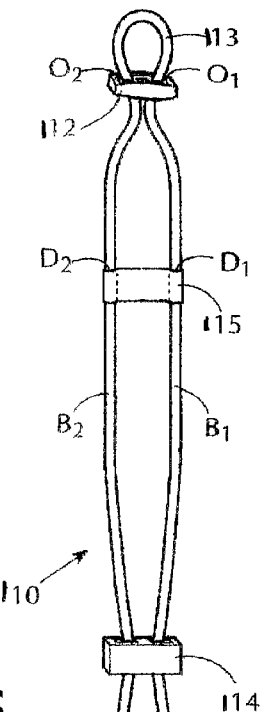
FIG. 5 illustrates the continuous cable which is transformable into a collarless harness in according to U.S. Pat No. 5,934,224.

Referring now to FIG. 5, shown therein is a continuous cable 110 from which a harness in accordance with U.S. Pat No. 5,934,224 is created. The continuous cable may be formed of fabric material, such as nylon, or it may be made of flexible plastic material or of leather.

The continuous cable may be created from a single length of cabling that is folded in half to form two like branches $B_1$ and $B_2$. The branches are joined together at their ends to form an endless loop.

Encircling the branches at one end thereof is a metal ring 111. At the other end, branches $B_1$ and $B_2$ pass through the parallel slots $O_1$ and $O_2$ of a plastic buckle 112 (shown separately in FIG. 6). The joined together branches at this end create an eyelet 113 extending from the buckle whose eye is large enough to permit ring 111 to pass therethrough.

Slidable along branches $B_1$ and $B_2$ is a lockable clamp 114 which acts to clamp the branches together at a position determined by the clamp setting when it is locked. A commercially available push-button operated lockable clamp may be used for this purpose.

Figure 7:
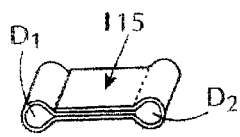
FIG. 7 separately shows the spacer element included on the harness.

Intermediate of clamp 114 and buckle 112 and slidable along branches $B_1$ and $B_2$ is a spacer element 115. As shown separately in FIG. 7, spacer element 115 which may be formed of fabric or plastic material is provided with parallel ducts $D_1$ and $D_2$ through which the cable branches pass. Spacer element 115, which keeps the cables apart, is shiftable along the branches between buckle 112 which holds the branches close together and clamp 114 which clamps the branches together.

Figure 9:
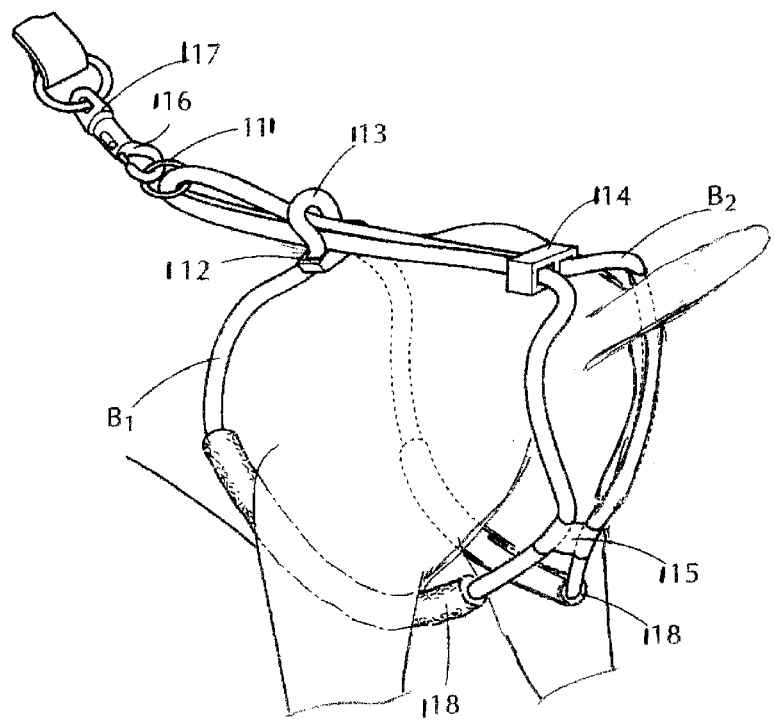
FIG. 9 shows the same harness according to U.S. Pat No. 5,934,224, but installed according to the method of the present invention as seen from one side of the dog.
Figure 10:
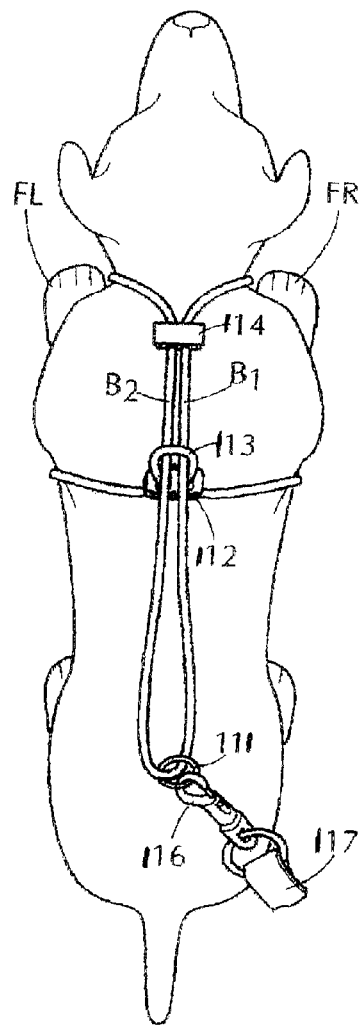
FIG. 10 shows the harness as shown in FIG. 8 (installed according to the method disclosed in U.S. Pat No. 5,934,224), as seen from the top of the dog.
Figure 11:
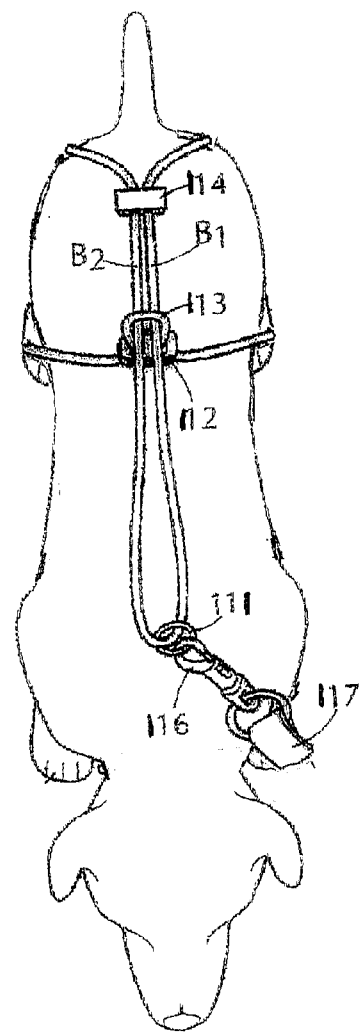
FIG. 11 shows the harness as shown in FIG. 9 (installed according to the method of the present invention), as seen from the top of the dog.

FIGS. 10 and 11 readily show the difference in the methods of installation disclosed in U.S. Pat No. 5,934,224 and the method of installation according to the present invention, respectively. In FIG. 10 (and also FIG. 8), the harness is installed at the forward portion of the dog. In FIG. 11 (and also FIG. 9), the harness is installed at the rear portion of the dog with the tail extending through the opening where the head did in the prior method.

Figure 8:
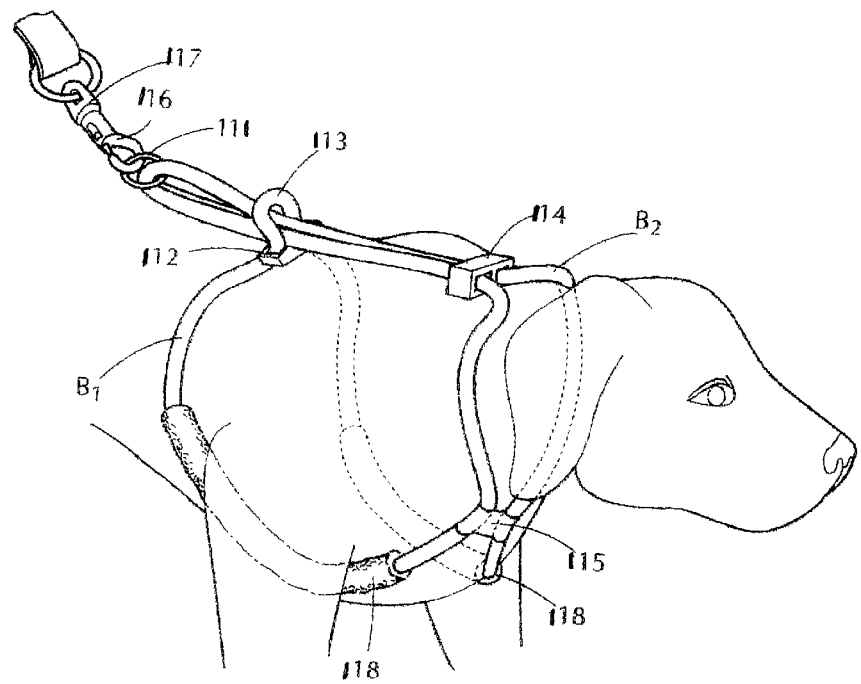
FIG. 8 shows a dog having the harness installed thereon according to U.S. Pat No. 5,934,224, as seen from one side of the dog.

As illustrated in FIGS. 8 and 10, when cable 110 which forms a continuous loop is installed on dog D to create a collarless harness, clamp 114 is then positioned along the branches so that it overlies the shoulder of the dog below its neck, midway between the right foreleg FR and the left foreleg FL of the dog. Buckle 112, from which eyelet 113 projects, is positioned to overlie the body of the dog, while spacer element 115 is placed adjacent the chest of the dog. Obviously, the respective positions of buckle 112, spacer element 115 and clamp 114 must be adjusted by the installer to accommodate the geometry of the dog on which the harness is installed.

As illustrated in FIGS. 9 and 11, when cable 110 which forms a continuous loop is installed on dog D according to the method of the present invention, clamp 114 is then positioned along the branches so that it overlies the rear back of the dog forward of its pelvis, midway between the right rear leg and the left rear leg of the dog. Buckle 112, from which eyelet 113 projects, is positioned to overlie the body of the dog, while spacer element 115 is placed adjacent the rear end of the dog. Obviously, the respective positions of buckle 112, spacer element 115 and clamp 114 must be adjusted by the installer to accommodate the geometry of the dog on which the harness is installed.

Ring 111 which passes through eyelet 113 is engaged by the snap-connector 16 of a leash 17, as shown in FIG. 11. In order therefore to be able to unharness the dog, one must first decouple the leash from the ring.

The harness arrangement is such that branches $B_1$ and $B_2$ run from ring 111 at one end of the harness through eyelet 113 projecting above buckle 112 on the body of the dog, and from eyelet 113 to clamp 114 overlying the rear back of the dog. From clamp 114, branches $B_1$ and $B_2$ separate to go down opposite sides of the dog and then pass through the left and right rear leg crotches, as shown in FIG. 9. Additionally, spacer element 115 is positioned adjacent the rear end of the dog.

From the rear leg crotches, branches $B_1$ and $B_2$ of cable 110 then go up the body of the dog to terminate in eyelet 113 through which is threaded the ring end of the branches.

When therefore dog D, by sitting down or slowing down the pace while the leash 117 is being pulled forward, puts a strain on leash 117 coupled to ring 111 of the harness, the resultant pull on branches $B_1$ and $B_2$ causes these branches to ride up the rear leg crotches to engage and press against the sensitive rear leg pits of the dog and spacer element 115 places pressure on the rear end of the dog. In order to relieve this pressure, the dog reacts by getting up from a sitting position to a standing position and commence walking or remain walking at the desired pace, thereby relieving the strain on the leash and causing the branches to loosen and disengage from the rear leg pits and relieving the pressure on the rear end.

Because ring 111 at one end of the branches of the harness passes through eyelet 113 which is effectively anchored on the body of the dog, the orientation of the harness on the dog is maintained regardless of the angle of the leash, with respect to the harness. Hence a strain on the leash regardless of how it is angled with respect to the dog, always acts to properly activate the harness.

According to another aspect of the present invention, rather than connecting leash 117 directly to the ring 111, a lead line can be connected at one end thereof to the ring 111 and the other end fed through a slide loop attached to a collar or chest harness on the dog, then attached to the leash 117. In this manner, the leash would be strained if the dog lurched forward or wanted to increase the pace. The dog would stop or slow down to release the strain.

Another advantage of passing the leash coupling ring 111 through the eyelet 113 anchored on the body of the dog is that this serves to latch the harness to the dog. If the end of the branches carrying the coupling ring were free from the body of the dog, the dog could then escape from the harness.

The branches of the harness which pass through the right and left rear leg crotches rub against the surface of the dog when the branches are tightened. With continued use of the harness, this action may cause irritation or chafing.

To avoid such chafing without however interfering with the ability of the harness to control the dog, there is preferably mounted on each branch of the harness an elongated protective sleeve 118. An example of sleeve 118 is disclosed in Sporn U.S. Pat. No. 5,485,810, previously incorporated herein by reference, has a tubular inner liner of woven or knitted nylon, on which is anchored a soft coat of Sherpa or cashmere wool. When the cable branch carrying sleeve 118 is tightened because the leash is strained, sleeve 18 does not shift axially. However the cable branch within sleeve 118 slides along the smooth surface of the inner liner, and as it is tightened, the branch causes the sleeve to ride up the rear leg crotch to engage the rear leg pit to apply pressure thereto. But because the sleeve engaging the pit is soft and is not shifted axially, no chafing takes place or is at least reduced. The use of protective sleeves is optional, for the cable from which the harness is made may be formed of fabric cord material having a soft, non-abrasive outer pile.

Thus instead of a spacer element which is slidable on the branches of the harness to keep them apart, use may be made of a slider which brings the branches closer together. The spacer element is appropriate for large dogs, while the slider is useful for smaller dogs.

And instead of a harness in which the branches carrying the ring is free to slide in the eyelet to cause the branches to ride up the rear leg crotches when the leash coupled to the ring is strained, the ring may be fixedly joined to the eyelet or to the buckle. In that case, when the leash is strained, the entire harness is tightened to cause the branches to ride up the rear leg crotches to engage the rear leg pits end also to tighten the harness about the body of the dog.

Figures 12, 13:
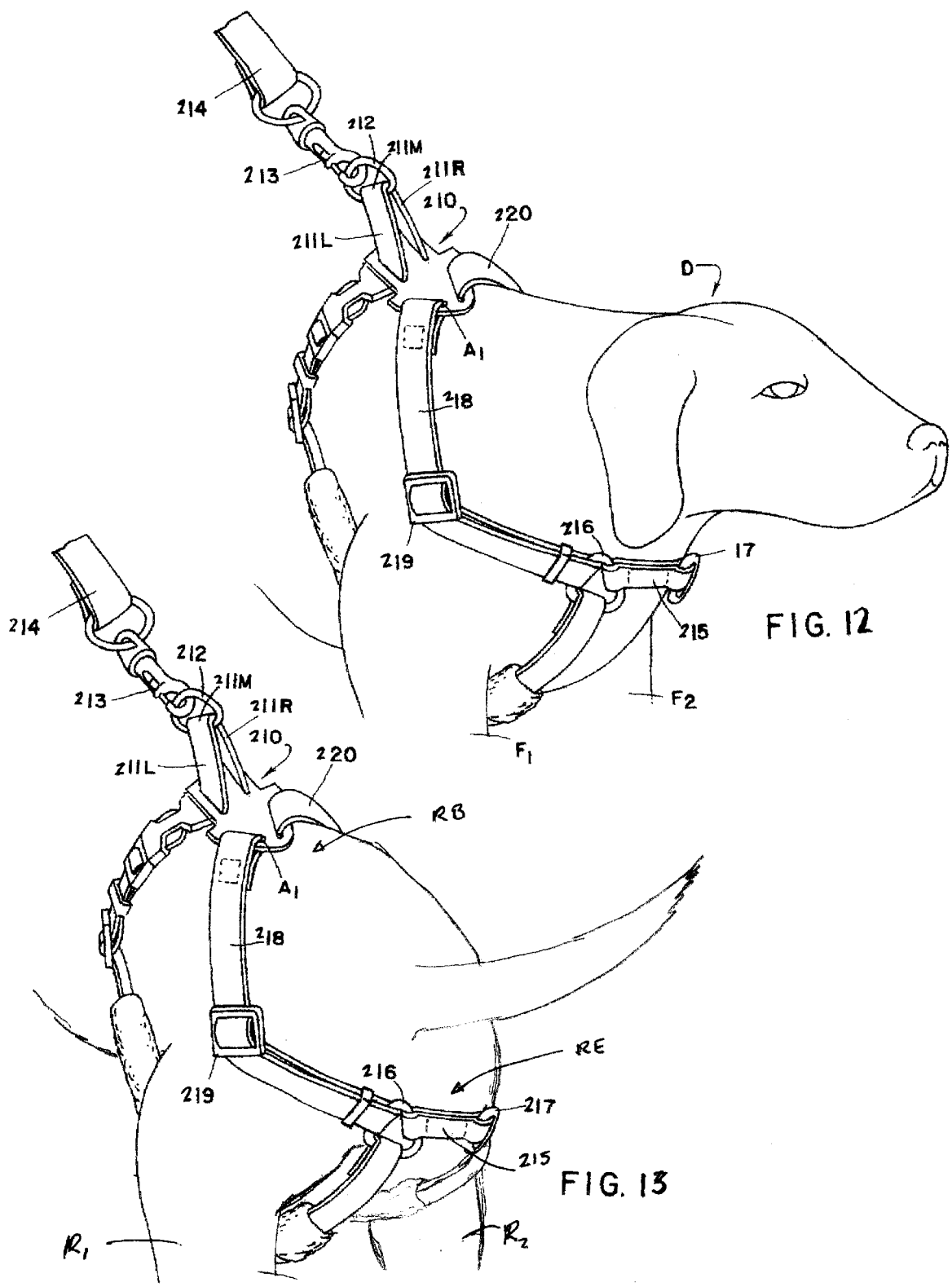
FIG. 12 shows a dog wearing a harness according to U.S. Pat No. 5,676,093 and leash assembly installed according to the method disclosed therein.
FIG. 13 shows a dog wearing a harness according to U.S. Pat No. 5,676,093 and leash assembly installed according to the method of the present invention.
Figure 14:
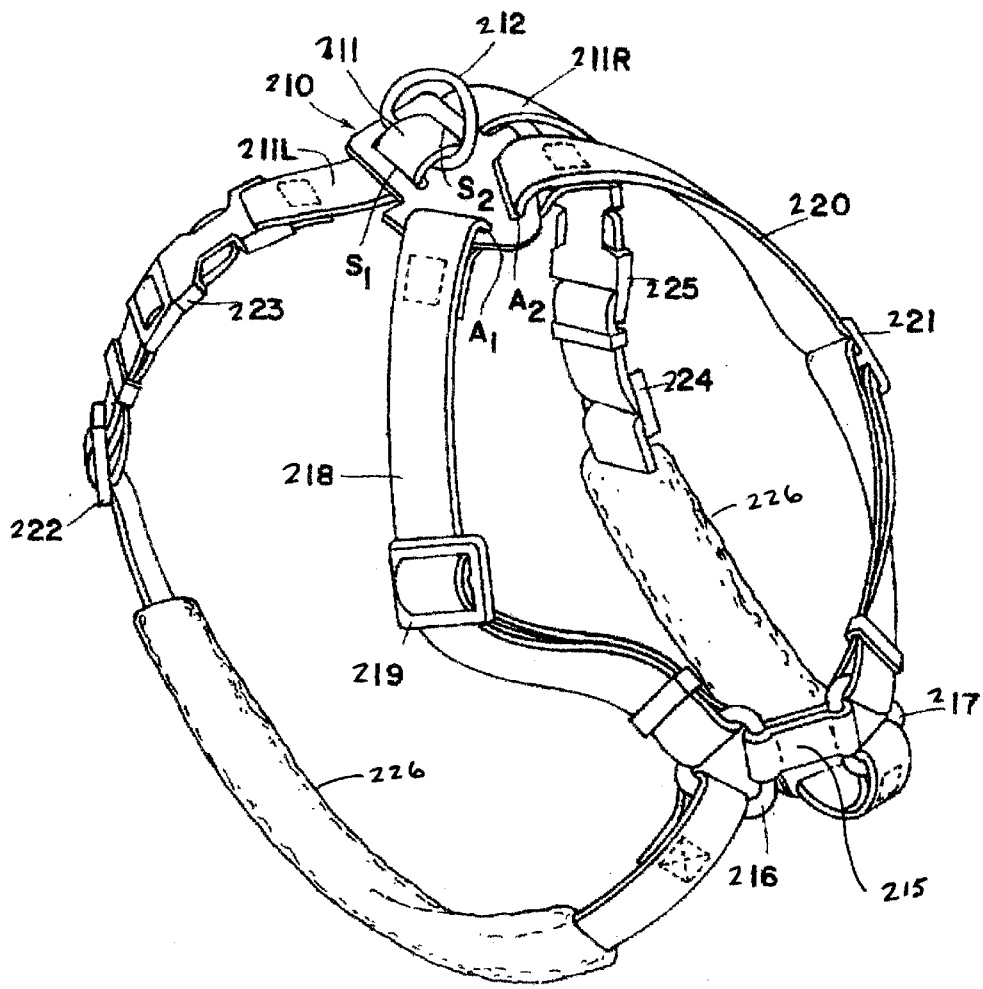
FIG. 14 separately illustrates the harness shown in FIGS. 12 and 13.
Figure 15:
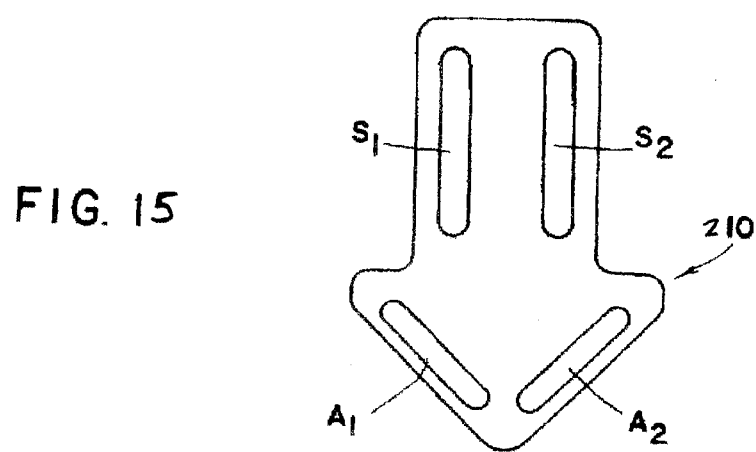
FIG. 15 shows the first junction included in the harness of FIG. 14.

Referring now to FIGS. 12, 14 and 15, there is illustrated in these figures a controllable harness and leash assembly according to U.S. Pat No. 5,676,093 installed according to the method disclosed therein. The harness is adjustable to the size of the dog on which it is installed.

The harness includes a first junction 210, (shown separately in FIG. 15) formed of an arrow-shaped plate of brass, plastic or other suitable high-strength material. The first junction 210 is provided at its narrow shaft upper zone with a pair of slide openings $S_1$ and $S_2$, and at its lower arrow zone with slots defining converging left and right side arms $A_1$ and $A_2$.

Threaded through the respective slide opening $S_1$ and $S_2$ of the first junction 210 are the left and right sections 211L and 211R of leash-linking strap 211 having at its midsection 211M a coupling ring 212. The left and right sections of the strap cannot be pulled through the first junction 210, for this action is blocked by midsection 211M. Coupling ring 212 as shown in FIG. 12 is linked to the retractable clasp 213 which terminates the leading end of a leash 214 formed of the same fabric webbing as that of strap 211.

Also included in a second junction 215 formed by a short transverse fabric strap having left and right rings 216 and 217 secured to its opposite ends.

The left section 211L of the leash-linking strap is coupled to ring 216 of the second junction 215 and the right section 211R is coupled to ring 217 of this junction.

Extending between left arm $A_1$ of the first junction 210 and left ring 216 of the second junction 215 on one side of the dog is a fabric strap 218 provided with a tri-slide 219 that is adjustable along the strap to vary its length to accommodate the harness to the body of the dog. Obviously the bigger the dog the greater is the distance between its shoulder and chest and the greater must be the length of strap 218 which runs between the first junction 210 and the second junction 215. Similarly, extending between right arm $A_2$ of shoulder junction and right ring 217 of the second junction 215 on the other side of dog is a fabric strap 220 provided with a tri-slide 221 to adjust the length of this strap.

The left section 211L of the leash-linking strap 211 is provided with a tri-slide 222 to adjust the length of strap 211 and a releasable buckle 223. The right section 211R of strap 211 is provided with a tri-slide 224 and a releasable buckle 225. When released, the buckle opens up the harness so that it can be installed on the dog or taken off.

When the harness is installed on a dog D according to the method disclosed in U.S. Pat No. 5,676,093, as shown in FIG. 12, the second junction 215 lies against the chest of dog D intermediate its left and right foreleg crotches. The first junction 210 overlies the shoulder of the dog intermediate its left and right forelegs $F_1$ and $F_2$. The strap sections 211R and 211L extend from the second junction 215 to the first junction 210 through the respective foreleg crotches of the dog and when the leash is strained, the leash coupling ring 212 which is joined to the midsection 211M of strap 211 causes the strap sections to ride up the foreleg crotches to engage the foreleg pits.

When the harness is installed on a dog D according to the method of the present invention, as shown in FIG. 13, the second junction 215 lies against the rear end RE of dog D intermediate its left and right rear leg crotches. The first junction 210 overlies the rear back RB of the dog intermediate its left and right rear legs $R_1$ and $R_2$. The strap sections 211R and 211L extend from the second junction 215 to the first junction 210 through the respective rear leg crotches of the dog and when the leash is strained, the leash coupling ring 212 which is joined to the midsection 211M of strap 211 causes the strap sections to ride up the rear leg crotches to engage the rear leg pits with the second junction 215 placing pressure on the rear end RE.

Buckles 223 and 225 on strap sections 211R and 211L serve a dual function, for they not only permit the user of the harness to quickly install the harness on the dog and to just as quickly detach the harness, but the buckles also function as a limit on the extent to which the strap sections can apply pressure to the rear leg pits and rear end RE and to thereby avoid excessive pressure which may cause undue discomfort to the dog.

When the leash is strained, coupling ring 212 is pulled away from the first junction 210 in to cause the strap sections 211R and 211L to pull out of slide openings $S_1$ and $S_1$ of the shoulder junction. When the buckles 223 and 225 on these strap sections reach the slide openings, further withdrawal of the strap sections is arrested, for the buckles are blocked by the slides openings.

With the harness installed according to the method of the present invention and the harnessed dog is led by an individual holding leash 214 at an acceptable pace, and the walking dog does not then strain against the leash, the harness remains fairly loose and comfortable, and the strap sections 211L and 211R passing through the rear leg crotches are then disengaged from the sensitive pits of the dog's rear legs.

However, should the dog sit down or seek to decrease its pace so that it is moving slower than the individual walking the dog, the leash held by the individual will then be strained. This strain acts to exert a pull on strap sections 211L and 211R which will concurrently ride up the rear leg crotches to engage and press against the sensitive rear leg pits with the second junction 215 exerting pressure on the dog's rear end RE. The resultant discomfort will induce the dog to relax the strain on the leash so that the cables no longer press against the sensitive pits and relieve the pressure on the rear end. However as pointed out previously, the buckles on the strap sections limit movement of the strap sections to prevent undue discomfort.

In the harness shown in FIG. 14, the strap sections 211L and 211R go through the left and right foreleg crotches in FIG. 12 or the left and right rear leg crotches in FIG. 13. When the strap sections 211L and 211R are tightened, they rub against the surface of the dog. With continued use this action may cause chafing or irritation.

To avoid such chafing without however interfering with the ability of the harness to control the dog on which it is installed, there is preferably mounted on each strap section an elongated protective sleeve 226, similar to sleeve 118 in FIGS. 8 and 9.

Figure 16:
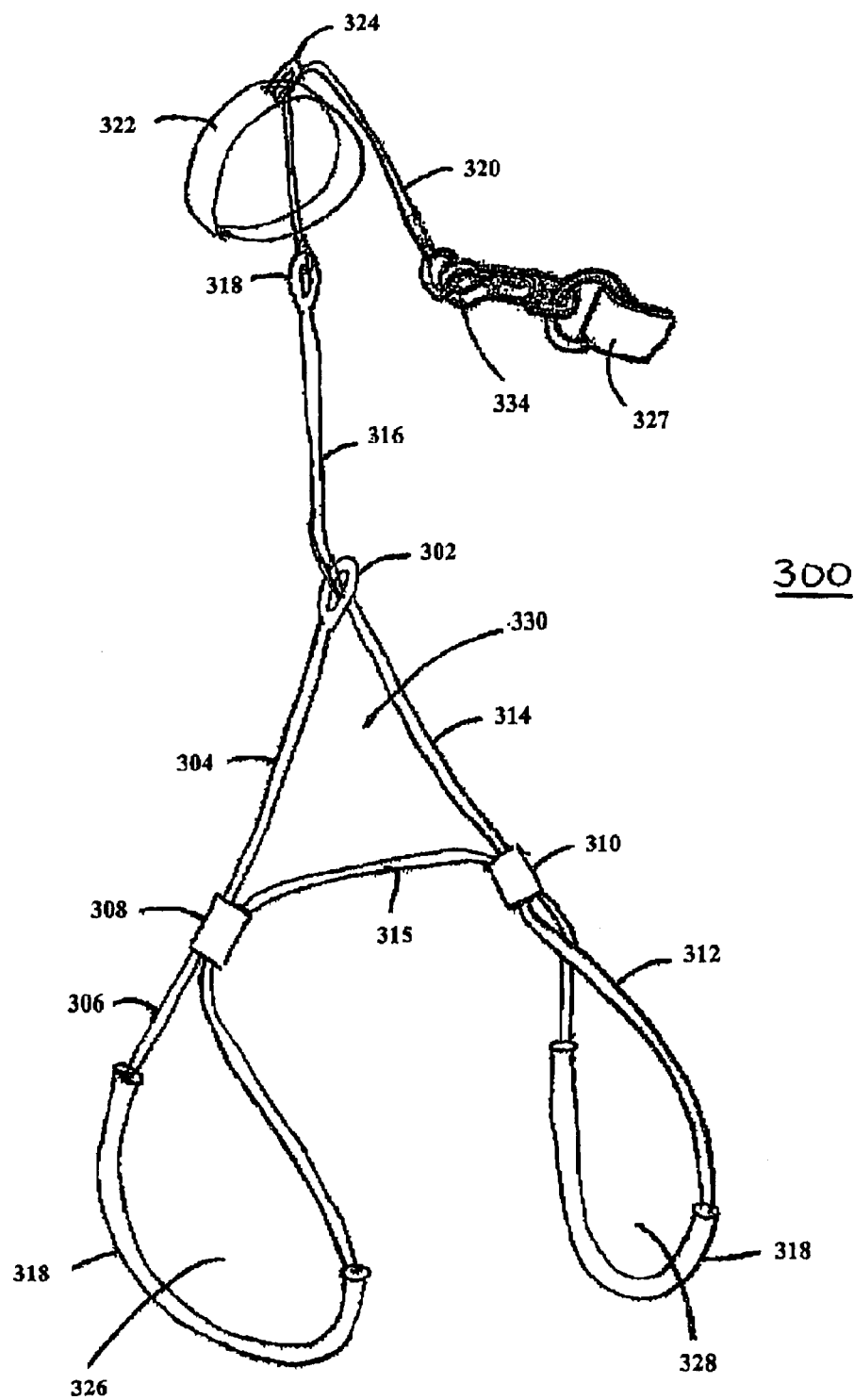
FIG. 16 shows a harness according to the present invention.

Referring now to FIG. 16, there is shown a harness 300 according to the present invention. The harness 300 includes a first adjuster 308, a second adjuster 310, and a strap having a first end loop 302 and a second end loop 318. The first portion 304 of the strap extends between the first end loop 302 and the first adjuster 308. The strap is inserted and then extends through the first leg adjuster 308 and then back through the first leg adjuster 308 forming a first leg loop 306. The portion of the strap exiting the first adjuster 308 and then entering the second adjuster 310 is strap portion 315. The strap then exits the second adjuster 310 and back through the second adjuster 310 forming the second leg loop 312. The portion of the strap exiting the second adjuster 310 up to the first end loop 302 is strap portion 314. The strap continues through the first end loop 302 and ends at the second end loop 318. The portion of strap extending through the first end loop 302 and ending at the second end loop 318 is strap portion 316. Strap portions 304, 314 and 315 form a triangular-shaped opening 330 with the first adjuster 308, second adjuster 310 and first end loop 302 as the apexes for the triangular opening 330.

The first adjuster 308 and second adjuster 310 can have a single channel extending therethrough or two channels with the strap extending through the channels. When only one channel is present, the first adjuster 308 and the second adjuster 310 can be a slider that brings the two straps extending therethrough together. The slider can be a tubular sleeve. The tubular sleeve can be similar to the protective sleeve 118 in FIGS. 8 and 9, but of shorter length. The tubular sleeve can also be a sleeve of textile material. When two channels are present, the first adjuster 308 and second adjuster 310 can be similar to spacer element 115 shown in FIG. 7. The spacing between the two channels can be selected to be larger or smaller depending on the size of the dog. The adjusters 308 and 310 allows the lengths of the leg loops 306 and 312 and strap portion 315 to be adjusted to accommodate the size of the dog. Therefore, the harness 300 is adjustable.

If the harness is installed at the front end of an animal, then the front legs are inserted into loops 326 and 328 and the head into the triangular opening 330. If the harness is installed according to the method of the present invention, then the rear legs are inserted into loops 326 and 328 and the tail into the triangular opening 330 with strap portion 315 adjacent the rear end of the animal.

To prevent chaffing of the crotches and pits of the front or rear legs depending on how the harness is installed, a protective sleeve 318 is preferably placed on loops 306 and 312 similar to sleeve 118 in FIGS. 8 and 9.

A lead line 320 and a collar 322 or chest harness (not shown) with a slide loop 324 as shown in FIG. 16 can be used to connect a leash 327 with a lockable hook 324. This configuration can be used when the harness is installed according to the method of the present invention on the rear portion of the animal. The collar 322 would be installed on the neck of the animal. This configuration would also prevent a dog from lurching forward since this would cause stain in the leash 327 to cause the loops 306 and 312 to ride up and contact the sensitive pits of the rear legs and place pressure on the rear end of the animal via strap portion 315. Additionally, the slack in the lead line 320 and strap portion 316 would be reduced placing a strain on the back of the animal preventing it from fully extending as when running.

While there have been shown preferred embodiments of the invention, it is to be understood that many changes may be made thereon within the spirit of the invention.

What is claimed is:

1. A method of installing a harness on a four-legged animal used to aid in training and exercising the animal and to aid in urging the animal from a sitting position to an upright position, wherein the animal has a rear back, a rear end, a left rear leg, a left rear leg pit, a right rear leg and a right rear leg pit, harness comprises:

a first loop,
 a second loop, and
 a first connecting portion, wherein said first and second loops are connected to the first connecting portion,
said method comprising:
 placing the first loop substantially around the left rear leg;
 placing the second loop substantially around the right rear leg;
 placing the first connecting portion adjacent the rear back such that the first and second loops are below the left and right hind leg pits, respectively; and
 attaching the first connecting portion directly or indirectly to a leash,
 whereby pulling the first connecting portion in a forward direction relative to the animal causes the first and second loops to come into contact with the left and right rear leg pits and impose pressure thereon urging the animal to take action to release the pressure by sitting up and or moving forward.

2. The method of claim 1, wherein the leash is directly connected to the first connecting portion.

3. The method of claim 1, wherein the animal has a neck, the method further comprising:
 attaching a collar or a chest harness having a slide loop to the neck;
 feeding a lead line having a first end and a second end through the slide loop;
 attaching the first end to the first connecting portion; and
 attaching the second end to the leash.

4. The method of claim 1, wherein the first loop and the second loop each have a first loop end and a second loop end, and the method further comprises:
 crossing the first loop and the second loop adjacent the rear end of the animal prior to connecting to the first connecting portion creating a crossing site, whereby when the first connecting portion is pulled forward the crossing site places pressure on the rear end of the animal also urging the animal up from a sitting position to a standing position and or forward in a standing position.

5. The method of claim 1, wherein a second connecting portion is attached to the first and second loops wherein in an installed position on the animal the second connecting portion is adjacent to the rear end of the animal, whereby when the first connecting portion is pulled forward the second connecting portion places pressure on the rear end of the animal also urging the animal up from a sitting position to a standing position and or forward in a standing position.

6. A harness for a four-legged animal, the harness comprising:

a first adjuster;

a second adjuster;

a strap having a first end loop and a second end loop;

a first leg loop; and a second leg loop, wherein the strap extending from the first end loop is inserted through the first leg adjuster and then back through the first leg adjuster forming the first leg loop, then through the second adjuster and back through the second adjuster forming the second leg loop, and then through the first end loop forming a triangular-shaped opening with the first adjuster, second adjuster and first end loop as the apexes for the triangular opening, wherein the triangular opening is for the head or the tail of the animal depending if installed on the chest of the animal or on the rear end of the animal, respectively.

7. The harness of claim 6, further comprising:

a first leg protector on the first leg loop, and a second leg protector on the second leg loop.

8. The harness of claim 6, further comprising:

means for attaching a leash to the strap.

9. The harness of claim 8, where the means for attaching a leash is a second end loop on the strap.

* * * * *